(12) United States Patent
Alexander et al.

(10) Patent No.: US 6,907,615 B1
(45) Date of Patent: Jun. 14, 2005

(54) SYSTEM AND METHOD FOR INTERCONNECTING COMPONENTS THAT EMPLOY EITHER COMPOSITE OR S-VIDEO SIGNALS

(75) Inventors: Douglas Alexander, Woodside, CA (US); Tim Bucher, Los Altos, CA (US); Stephen G. Perlman, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/490,882

(22) Filed: Jan. 24, 2000

Related U.S. Application Data (63) Continuation-in-part of application No. 09/244,222, filed on Feb. 4, 1999, now Pat. No. 6,169,879, which is a continuation-in-part of application No. 09/154,609, filed on Sep. 16, 1998, now Pat. No. 6,530,085.

(51) Int. Cl.[7] .................................................. H04N 7/18
(52) U.S. Cl. ........................... 725/80; 725/85; 725/133; 725/141; 725/153; 439/502
(58) Field of Search ............................ 725/80, 82, 85, 725/131, 133, 139, 141, 151, 153; 439/176, 502

(56) References Cited

U.S. PATENT DOCUMENTS

| | | | | |
|---|---|---|---|---|
| 4,603,349 A | * | 7/1986 | Robbins ..................... | 725/151 |
| 4,864,632 A | * | 9/1989 | Moriyama et al. ............ | 725/78 |
| 5,548,338 A | | 8/1996 | Ellis et al. ................... | 348/473 |
| 5,572,263 A | | 11/1996 | Kim et al. ................... | 348/705 |
| 5,579,055 A | | 11/1996 | Hamilton et al. ........... | 348/476 |
| 5,585,837 A | | 12/1996 | Nixon ........................... | 348/6 |
| 5,619,247 A | | 4/1997 | Russo .......................... | 348/3 |
| 5,640,453 A | | 6/1997 | Schuchman et al. ......... | 380/10 |
| 5,835,126 A | | 11/1998 | Lewis .......................... | 348/8 |
| 5,867,223 A | | 2/1999 | Schindler et al. ........... | 348/552 |
| 5,880,768 A | | 3/1999 | Lemmons et al. ............. | 348/1 |
| 5,886,732 A | | 3/1999 | Humpleman .................. | 348/10 |
| 6,169,879 B1 | * | 1/2001 | Perlman ..................... | 725/119 |
| 6,178,474 B1 | * | 1/2001 | Hamano et al. ............ | 710/303 |
| 6,226,053 B1 | * | 5/2001 | Cho ............................ | 348/705 |
| 6,530,085 B1 | * | 3/2003 | Perlman ...................... | 725/82 |

OTHER PUBLICATIONS

ATI Technologies, Inc., "All–In–Wonder User's Guide," (Version 1.0, Revision A) 1997, pp. 14 and 37–38.*
RadioShack, 1998 Answers Catalog, (1998), p. 119.*

* cited by examiner

Primary Examiner—Chris Grant
Assistant Examiner—Brian Shelton
(74) Attorney, Agent, or Firm—Workman Nydegger (57) ABSTRACT

Systems and methods for use in interconnecting consumer electronic devices in an entertainment system that allow for switching between composite video and S-video formats. The systems and methods support left audio, right audio, and can be selectively adapted to support either composite video or S-video signal formats. The systems and methods further allow for a determination that a consumer electronic device is connected, the type of device that is connected, and the type of signal format that is being utilized for the transmission.

29 Claims, 8 Drawing Sheets

SYSTEM AND METHOD FOR INTERCONNECTING COMPONENTS THAT EMPLOY EITHER COMPOSITE OR S-VIDEO SIGNALS

RELATED APPLICATIONS

This application is a continuation-in-part of U.S. patent application Ser. No. 09/244,222, filed Feb. 4, 1999, now U.S. Pat. No. 6,169,879 entitled "System and Method of Interconnecting and Using Components of Home Entertainment System," which is a continuation-in-part of U.S. patent application Ser. No. 09/154,609, filed Sep. 16, 1998, now U.S. Pat. No. 6,530,085 entitled "System for Enhanced Entertainment System Control." Both of the foregoing patent applications are incorporated herein by reference.

BACKGROUND OF THE INVENTION

1. The Field of the Invention

The present invention relates to interconnecting and using a plurality of consumer electronic devices. More specifically, the present invention is directed to systems and methods that allow for the interconnection of consumer electronic devices that employ either composite or S-video signals, such as television sets, VCRs, stereo systems, video disk players, satellite receivers, cable boxes, video game players, and Internet terminal devices.

2. The Prior State of the Art

The television set has been a source of entertainment for individuals since its introduction and traditionally has been a fairly simply device for users to set up and connect. A user simply unboxed the television set, connected the antenna, plugged in the power cord and turned on the television set. Since the inception of television, other consumer electronic devices have been introduced that may be connected to a television set to create a home entertainment system. For instance, VCRs, videodisk players, and video game devices provide enhanced entertainment. Cable television services and satellite receivers along with traditional broadcast antennas provide reception of video programming. Home theater systems provide stereo and near theater quality audio. Internet terminals, such as WebTV® boxes developed by WebTV Networks, Inc., of Palo Alto, Calif., allow consumers to connect to the Internet and to send and receive information, using a television as the display device. Using the foregoing consumer electronic devices or others in combination with a television, consumers can now select and configure a wide variety of home entertainment systems.

Although many consumer electronic devices are available, connecting and using multiple devices in a home entertainment system can be extremely difficult and frustrating, particularly when the devices employ different signaling formats. The interconnection is further complicated because each of the various signaling formats requires its own type of connectors, such as RCA-type connectors, S-video connectors, and so forth. The connectors have traditionally connected the devices within a home entertainment system through the use of either a cable with RCA-type connectors attached or a cable with S-video connectors on both ends. The interconnection becomes complicated when a user desires to connect devices where one device has RCA-type connectors for transmitting composite signals, and the other device has an S-video connector for transmitting S-video signals.

It would, therefore, be an advancement in the art to simplify the method of connecting consumer electronic devices within a home entertainment system. It would also be an advancement in the art to provide a technique that would allow for the transmission of either composite or S-video signaling on the same connecting device. Further, it would be an advancement in the art if the connecting device could work with all types of consumer electronic devices. Such advancements would increase the ease of use of consumer electronic devices and would enable users to experience the full functionality of the devices.

SUMMARY OF THE INVENTION

The present invention relates to systems and methods for use in inter-device connectivity within an entertainment system that allow for switching between composite video and S-video formats. More specifically, the systems and methods support left audio, right audio, and can be selectively adapted to support either composite video or S-video. The systems and methods provide increased ease and flexibility, and improved interoperability of components within an entertainment system.

In one implementation of the invention, a system includes a cable with a left audio connector, a right audio connector, a male S-video connector and a mini plug. An adapter that has a male RCA end and a female S-video end is available for mating with the male S-video connector of the cable to allow for selective switching between S-video and composite video by employing a two-pin shortage. Thus, through the use of the adapter, the connector system is compatible with both the S-video and composite video formats.

Implementation of the invention eliminates the need for the user of the entertainment system to understand the specific requirements for connecting various consumer electronic devices together. Instead, the user must merely identify on the consumer electronic device whether an RCA-type connector or an S-video connector is required for connection. The identification is facilitated by the appearance of the two types of connectors being different. If an S-video end is required, the S-video male connector is inserted into the S-video female connector of the consumer electronic device. If an RCA-type connector is required, the S-video male connector is mated with the S-video end of the adapter, and the RCA male end of the adapter is connected to the RCA female connector of the consumer electronic device.

In the embodiment of the invention referred to above, the mini plug of the connector system has the same size shaft as a standard mini plug, but with an increased number of contact points. A receptacle within an electronic device mates with the mini plug. The receptacle contains at least one contact point that is used for ground sensing in order for the accompanying software to detect which devices are connected in the entertainment system.

Additional features and advantages of the invention will be set forth in the description that follows, and in part will be obvious from the description, or may be learned by the practice of the invention. The features and advantages of the invention may be realized and obtained by the means and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for interconnecting consumer electronic devices in a home entertainment system to allow for switching between composite video and S-video formats. The invention further extends to systems and methods that support left audio, right audio, and can be selectively adapted to support either composite video or S-video. According to one embodiment of the invention, a mini plug is included that has the same size shaft as a standard mini plug, but with an increased number of contact points. According to another embodiment, detection takes place as to which devices are connected in the home entertainment system. The systems and methods provide increased ease and flexibility, and improved interoperability of components in the home entertainment system.

The invention will be described through the use of diagrams to illustrate either the structure or processing of embodiments used to implement the systems and methods of the present invention. Using the diagrams in this manner to present the invention should not be construed as limiting its scope.

The invention will be described in reference to consumer electronic devices included in a home entertainment system. In this context, "consumer electronic device" or "electronic device" is used to refer to any number or type of various consumer electronic devices that provide audio output, video output, or information services or can be connected to a television set. Such devices include, but are not limited to, cable boxes, satellite receivers, video cassette recorders (VCRs), video game consoles, video disk players, home theater equipment, home stereo equipment, Internet terminals, personal computers, and television sets. "Home entertainment system" refers to a system that includes one or more consumer electronic devices and provides audio and/or video output to a user and is not limited to those that are used in residential buildings.

I. Connector Systems

Figure 1:
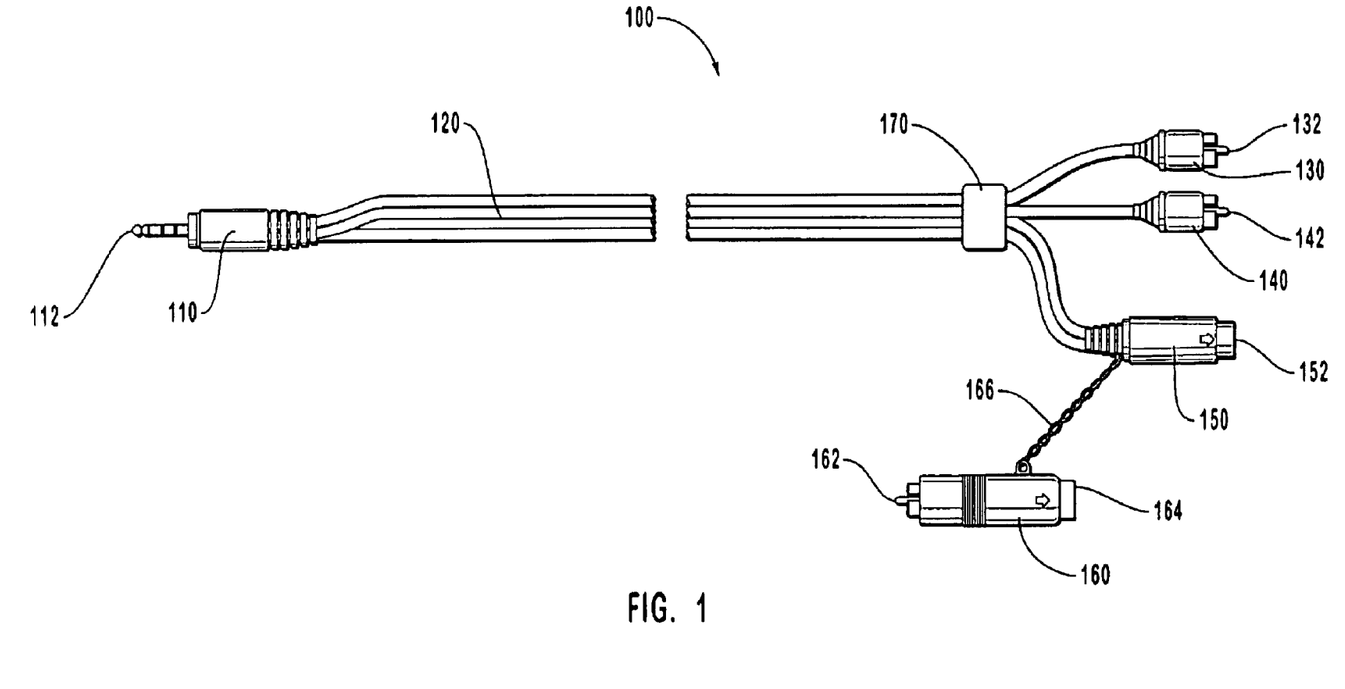
FIG. 1 is an illustration of an embodiment having a cable with a left audio connector, a right audio connector, a male S-video connector, a mini plug and an adapter that has a male RCA end and a female S-video end.

Referring now to FIG. 1, an embodiment is depicted generally as connector system 100 that includes mini plug 110 connected to cable 120, which is in turn connected to RCA connector 130, RCA connector 140, S-video connector 150, and adapter 160. Strain relief structure 170 is included to provide support to cable 120 and to prevent shearing or other deterioration of the electrical conductors within cable 120. In one embodiment, male mini plug shaft 112 of mini plug 110 has the same length and diameter as a standard male mini plug shaft. However, male mini plug shaft 112 has an increased number of contact points to enable the passage of either composite or S-video signals, as will be further explained below.

Cable 120 is any type of means for conducting electrical signals capable of being attached to connectors such as a mini plug, an RCA connector, and/or an S-video connector, thereby allowing audio and/or video signals to be conducted through the cable. By way of example, such means for conducting can include any suitable metallic conductors such as copper, nickel, silver, and so forth, surrounded by an insulator to allow for directed transmission of a signal.

RCA connectors 130 and 140 respectively support left audio and right audio when an RCA format is employed, as shall be further explained below. Male shafts 132 and 142 can be mated with female RCA connectors of an consumer electronic device or another cable system to provide a coupling with connector system 100 whereby a signal can be transmitted through the coupling.

S-video connector 150 supports audio and video signals when an S-video format is employed. Male S-video connector 152 can be mated with a female S-video connector of a consumer electronic device or another cable system to provide a coupling with connector system 100 whereby audio and video signals can be transmitted through the coupling.

Adapter 160 contains male RCA end 162 and female S-video end 164 and can be mated with S-video connector 150 to provide an equivalent RCA connector to support video signals when an RCA video format is employed. In one embodiment, adapter 160 is made available for mating with male S-video connector 152 by being attached to S-video connector 150 or cable 120. In one embodiment, and as illustrated in FIG. 1, means 166 for attaching adapter 160 to S-video connector 150 is employed. By way of example, means 166 can be any means for attaching adapter 160 to S-video connector 150 in order that adapter 160 is available to be coupled with S-video connector 150 when a composite signal is employed. By way of example, FIG. 1 illustrates attaching means 166 as a plastic thread. No signal is required to be transmitted through attaching means 166.

As mentioned above, connector system 100 is capable of conducting audio signals and video signals between electronic devices, regardless of whether the signals are in a composite or S-video format. Connector system 100 can also be used as a means for conducting only audio signals or only video signals. As explained above, the video signal can be in either a composite or S-video format.

Figure 2:
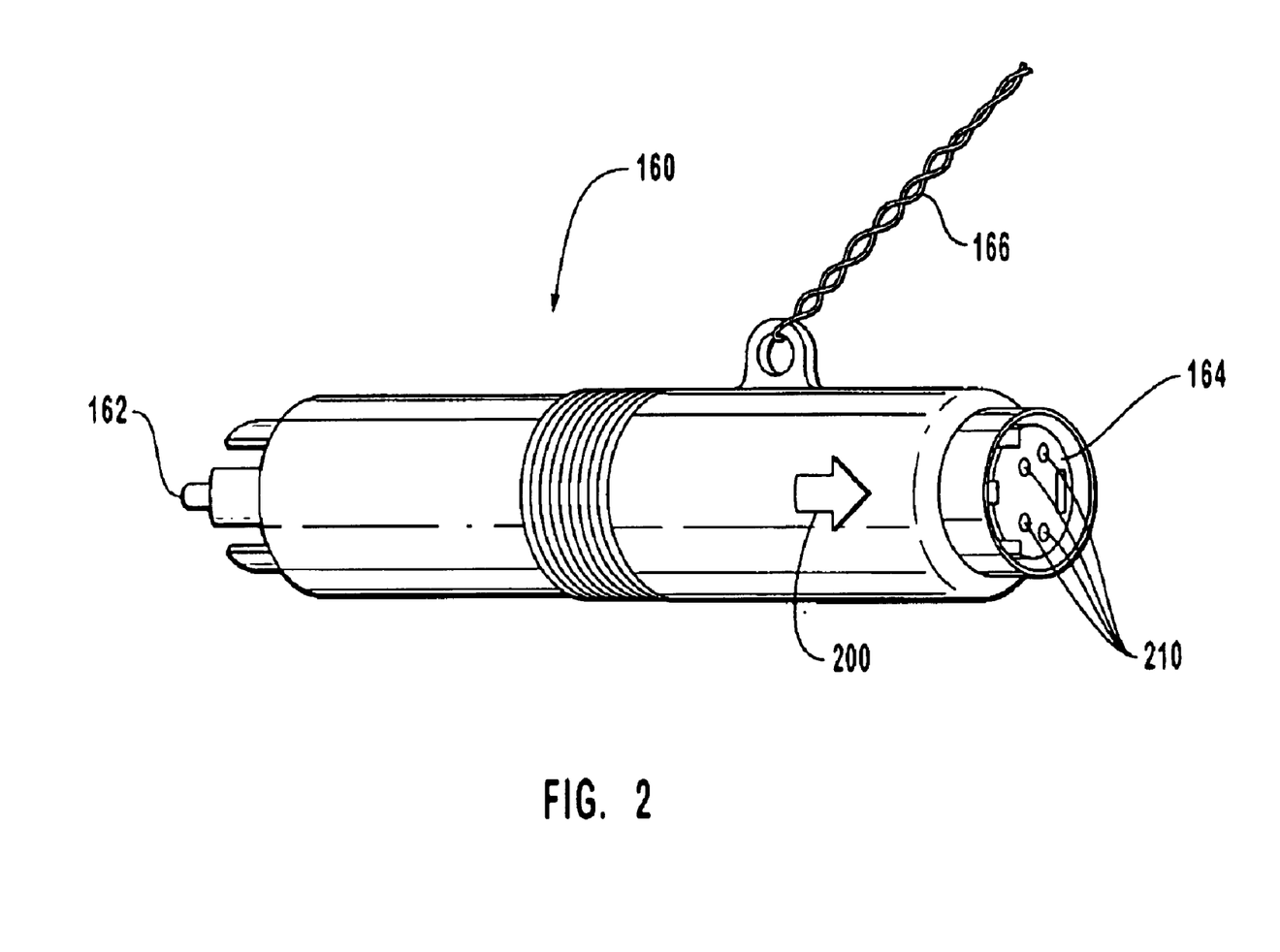
FIG. 2 is an illustration of an embodiment of an adapter that has a male RCA end and a female S-video end.
Figure 3:
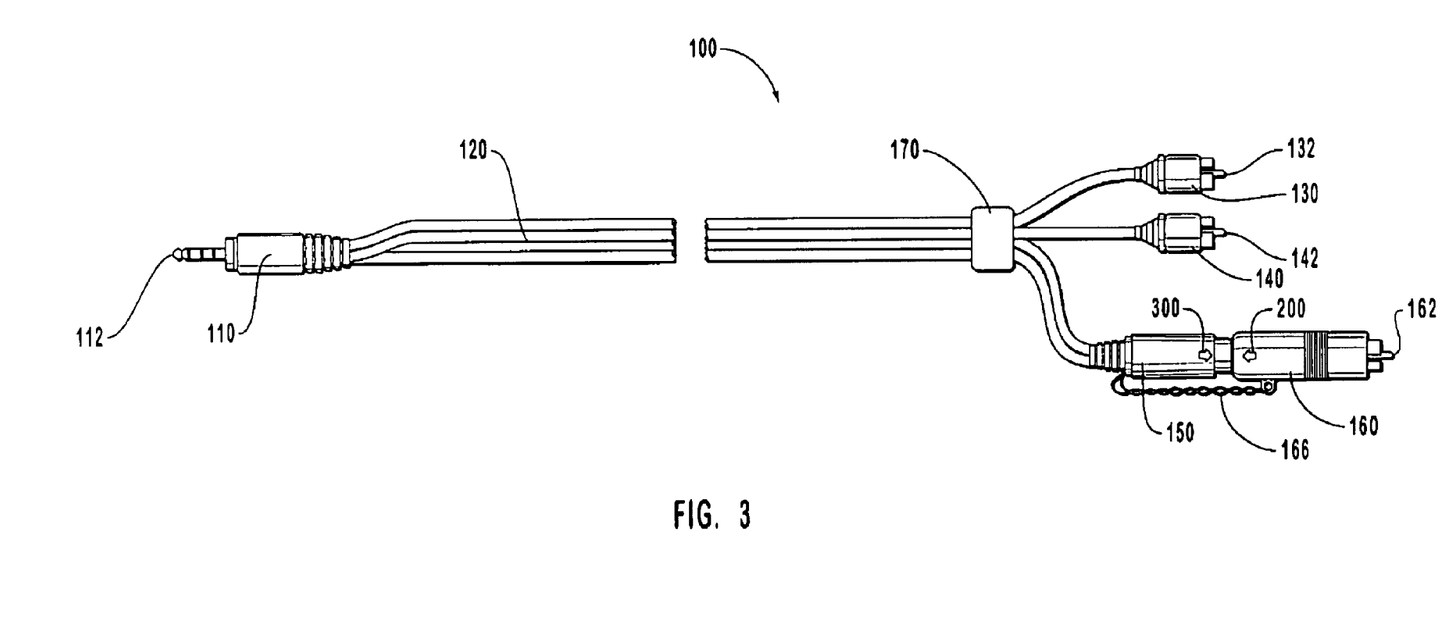
FIG. 3 is an illustration of an embodiment where the male S-video connector attached to the cable is mated with the female S-video end of the adapter, thereby effectively creating a male RCA connector.

Referring to FIG. 2, adapter 160 is illustrated to highlight female S-video end 164 having sockets 210 whereby corresponding pins on male S-video connector 152 are inserted to provide a connection between S-video connector 150 and adapter 160. The four sockets 210 and corresponding four pins on male S-video connector 152 are dedicated for the transmission of left audio, right audio, chroma, and luma. In order to assist a user in making a proper connection, in one embodiment symbols are placed on S-video connector 150 and adapter 160 in such a way as to allow for a proper alignment in the connection between S-video connector 150 and adapter 160. For example, adapter 160 has formed thereon an arrow 200 that matches a corresponding arrow 300 on S-video connector 150 as illustrated in FIG. 3 to assist the user in making a proper connection.

The combination of S-video connector 150 and adapter 160 provides an equivalent male RCA connector to support video signals when an RCA video format is employed. Upon the connection of S-video connector 150 with adapter 160, male RCA end 162 can be coupled with a female RCA connector of a consumer electronic device or another cable system so as to enable composite video signals to be transmitted through cable 120.

A consumer electronic device connected to mini plug 110 can be notified that adapter 160 is coupled with S-video connector 150 to allow for the transmission of a composite signal. By way of example, differential amplifiers or impedance sensors can detect which of the male pins on male S-video connector 150 are employed for transmitting a signal, can determine if the signal is in a composite or S-video format, and thus whether or not adapter 160 is coupled with S-video connector 150. The result obtained can then be transmitted to the consumer electronic device that is connected to mini plug 110 to notify the device as to whether or not adapter 160 is being employed.

When S-video connector 150 is mated with adapter 160 in preparation for conducting a composite signal, a two-pin shortage is established at the S-video connector. Based on the presence or absence of this two-pin shortage, the electronic device coupled to mini plug 110 can determine whether connector system 100 has been adapted to conduct composite or S-video signals. Based on this determination, the electronic device can infer which type of signal the electronic device connected to the opposite end of connector system 100 supports and, consequently, which type of signal is to be used to communicate with the opposite electronic device.

In one embodiment, measuring the impedance of the male pins of male S-video connector 152 provides a determination as to whether there is a two-pin shortage in S-video connector 150. As mentioned above, and by way of example, differential amplifiers or impedance sensors can be used to perform the measurement. As such, a differential amplifier can operate to detect a difference in voltage and serves as a comparator. The resultant voltage from the differential amplifier can inform a software component that adapter 160 is attached, resulting in a switch to the use of composite video signaling. In one embodiment, the resultant voltage is transmitted through the connector system to a computer chip located in central electronic device. The chip recognizes the change of impedance and switches over from an S-video format to a composite video format.

Because the two-pin shortage is performed automatically, all that the user must do is visually recognize whether a consumer electronic device requires an S-video connection or an RCA connection. S-video connectors and RCA connectors being visually different facilitate user recognition. If an S-video connection is required, then S-video connector 150 is used to provide the connection. If an RCA connection is required, then S-video connector 150 and adapter 160 are mated to provide an equivalent RCA connector that combines the chroma and the luma in order to support composite video signaling.

When adapter 160 is not coupled with S-video connector 150, RCA connectors 130 and 140 are not used since S-video connector 150 supports both audio and video signals. However, when adapter 160 is coupled with S-video connector 150, RCA connectors 130 and 140 are employed for supporting left and right audio. In either case, mini plug 110 continues to support left audio, right audio, video, and ground.

In view of he foregoing, adapter 160, S-video connector 150, and RCA connectors 130 and 140 represent one example of structure that corresponds to means for selectively adapting the interconnection system for use with either a composite video signal format or an S-video signal format. In general, the means for selectively adapting the interconnection system in this way extends to any other connectors that are attached to the ends of the plurality of electrical conductors in cable 120 opposite mini plug 110 in a manner such that i) the single cable system can be used for both composite and S-video signals and ii) at least some of the individual electrical conductors can be used at different times with electrical signals formatted according to the composite signal format and the S-video signal format.

Figure 4:
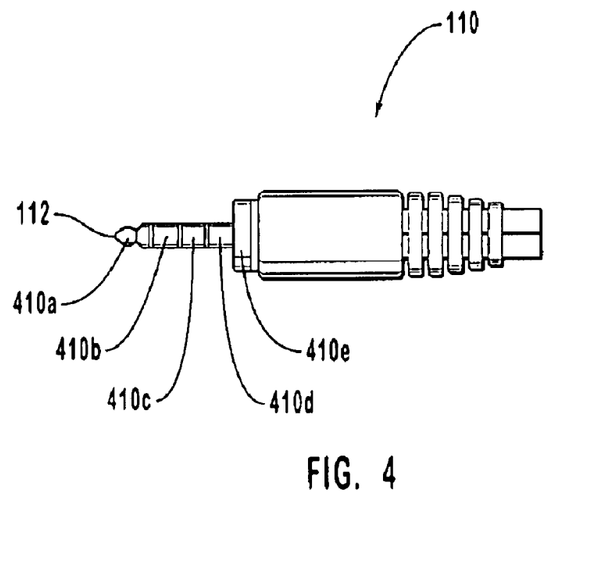
FIG. 4 is an illustration of a mini plug that has the same size shaft as a standard mini plug, but with an increased number of contact points.

FIG. 4 is an illustration of mini plug 110 having mini plug shaft 112 that provides an increased number of contact points on the same size shaft as a standard mini plug shaft. In one embodiment, mini plug shaft 112 includes five contact points 410*a–e*. The five contact points are for left audio, right audio, video chroma, video luma, and ground. In one embodiment, the end contact point 410*a* is used for left audio and the third contact point 410*c* is used for right audio. When S-video signaling is being transmitted, all five contact points 410*a–e* are in use. When composite signaling is being transmitted, the contact points for left audio, right audio, and ground and one video contact point are used since adapter 160 combines the video chroma and luma for composite signaling. Therefore, a single connector, such as mini plug 110, can be used for left and right audio and composite or S-video signals.

Figure 5:
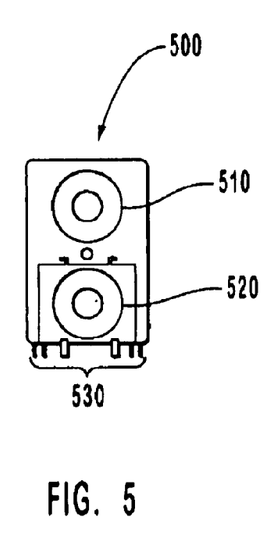
FIG. 5 is an illustration of a stacked dual receptacle that can be embedded in a consumer electronic device for mating with a mini plug.

FIG. 5 illustrates receptacle 500 that can be embedded in a consumer electronic device for mating with mini plug 110. In one embodiment, and as illustrated in FIG. 5, receptacle 500 is a dual stacked receptacle capable of supporting both upper and lower applications. As such, one of sockets 510 or 520 is dedicated for signals transmitted into receptacle 500 and the other socket is dedicated for signals transmitted out of receptacle 500. Moreover, receptacle 500 is said to be a dual stacked receptacle because of the presence of adjacent sockets 510 and 520. Mini plug 110 can be mated with either socket 510 or 520.

In one embodiment, receptacle 500 provides a contact point for connection with each of the five contact points 410*a–e* of FIG. 4, and one or more contact points for ground sensing. The contact points used for ground sensing recognize a physical displacement as a result of inserting mini plug 110, and notify a software component that mini plug 110 is inserted. Thus, the accompanying software can detect which devices are connected in a home entertainment system, as shall be further explained below. Pins 530 provide an electrical contact between receptacle 500 and the electrical components of the consumer electronic device of which receptacle 800 is embedded.

II. Determination of Connection Properties

Figure 6:
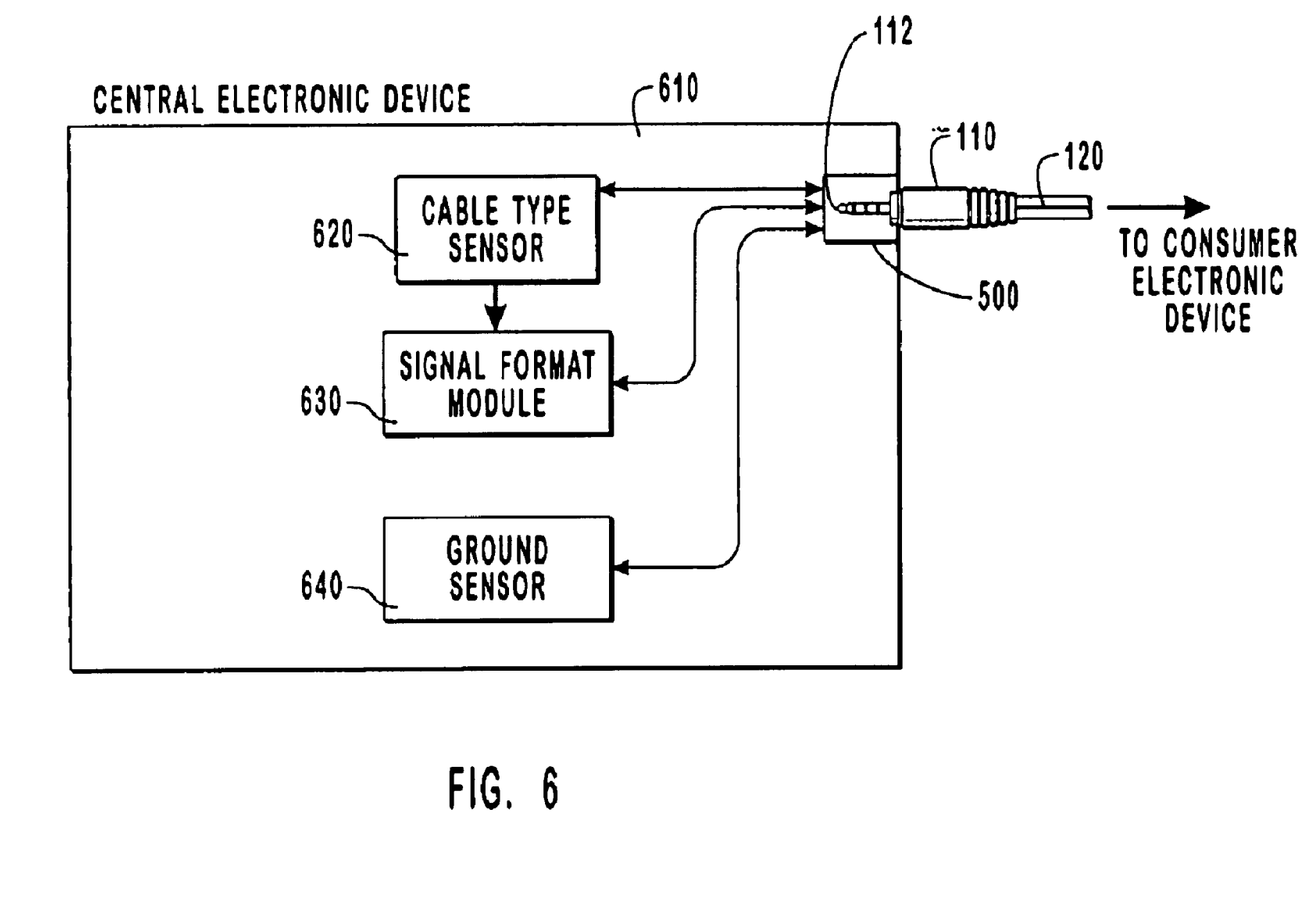
FIG. 6 is a schematic diagram demonstrating the mating of a receptacle, embedded in a consumer electronic device, with a mini plug, and further illustrates an embodiment where components of a central electronic device are used for sensing whether or not a proper connection has been made, the cable type connected thereto, and the format of the electrical signaling.

Referring now to FIG. 6, an embodiment is illustrated in which receptacle 500 can be embedded into a consumer electronic device and made available for mating with mini plug 110. In this embodiment receptacle 500 is embedded in central electronic device 610. In the embodiment of FIG. 6, central electronic device 610 includes hardware and/or computer-executable instructions for determining that a consumer electronic device is connected, the type of device that is connected, and the type of signal format that is being employed in the transmission. More specifically, central electronic device 610 includes cable type sensor 620, signal format module 630 and ground sensor 640.

When a contact point of receptacle 500 that is dedicated for ground sensing comes in contact with male mini plug shaft 112, ground sensor 640 is notified of the connection of mini plug 110 with central electronic device 610. As such, ground sensor 640 is used to recognize whether a proper connection has taken place between mini plug 110 and receptacle 500. Furthermore, ground sensor 640 can notify a user as to whether the connection is or is not proper. By way of example, the notification can take place either by utilizing hardware and/or software to illuminate a light, send an audio message or flash a message on a monitor notifying that the connection is proper, or in any other desired manner. The computer-executable instructions used to notify the user of a proper connection can be executed by a processor and can be contained in ROM, flash memory, and/or RAM.

In one embodiment, when the user connects mini plug 110 to receptacle 500, cable type sensor 620 determines whether cable 120 is an audio-video (AV) cable or an audio-only cable. For example, if cable 120 is connected to a digital satellite system (DSS) receiver, cable type sensor 620 determines that cable 120 is an AV cable. Cable type sensor 630 then determines whether the cable is an input or output cable with respect to the consumer electronic device by determining whether there is an audio or video signal on the cable. For example, if the user has connected a DSS receiver to central electronic device 610, cable type sensor 620 will determine that cable 120 is an AV output cable associated with a consumer electronic device.

When cable type sensor 620 has characterized cable 120 as AV or audio-only and as an input or output cable, the cable type sensor may need additional information to identify the consumer electronic device associated with cable 120. If so, central electronic device 610 can prompt the user to input the type of consumer electronic device. The prompt can be, for example, the display of a question or menu choice on a television set connected to central electronic device 610. Although identifying the consumer electronic device may require some user input, it does not require the user to understand whether cable 120 is AV or audio-only or whether it is an input or output cable. In view of the foregoing, cable type sensor 620 represents one example of means for identifying the type of signals that are compatible with the consumer electronic devices connected to central electronic device 610.

In some instances, cable type sensor 620 can also deduce the identity of the consumer electronic device connected to cable 120 using the signals carried on cable 120 and conductivity properties of the cable. For instance, cable type sensor 620 can determine whether the cable conducts only in one direction or measure the impedance of the jack to determine if the cable is connected to a microphone or is an audio connector.

Cable type sensor 620 can also determine whether the connected cable carries a composite or S-video signal. As mentioned above, cable 120 is supplemented with S-video-to-RCA video adapter 160, illustrated in FIGS. 1–3, which allows cable 120 to be used with televisions or other consumer electronic devices having either a composite or S-video format. Notably, mini plug 110 of cable 120 that connects to the central electronic device 610 of FIG. 6 is the same whether cable 120 is used with S-video or composite signals. Thus, the user inserts mini plug 110 into receptacle 500 of central electronic device 610 and when the consumer electronic device to be connected does not have an S-video connector, or when the user desired to use the RCA video input, adapter 160 is coupled to the end of S-video connector 150, as illustrated above in FIG. 3. When cable 120 is instead to be used with an S-video format, adapter 160 remains unconnected to S-video connector 150. In this case, S-video connector 150 is coupled with the corresponding S-video connector of the television.

Connector system 100 can therefore be used to connect a consumer electronic device to a home entertainment system without the user understanding the significance of the difference between S-video and RCA connections. The user merely selects a receptacle on central electronic device 610 and S-video connector 150 with or without adapter 160. Cable type sensor 620 can determine whether cable 120 is being used with or with out adapter 160 through the use of a two pin shortage, as explained above, and can determine the type of signal that is transmitted through cable 120 and thus how cable 120 is being used. If adapter 160 is used, cable type sensor 620 concludes that cable 120 is being used as an RCA cable. Otherwise, cable type sensor 620 concludes that cable 120 is being used as an S-video cable.

III. Exemplary Home Entertainment System Environment

The connector systems of the invention can be used to conveniently interconnect electronic devices arranged in the hub and spoke configuration. The connector systems can also be used to interconnect electronic devices having any other desired topology. By way of example, the connector system of the invention can be used to interconnect one consumer electronic device, such as a video camera, with another consumer electronic device, such as a television. In this example, receptacle 500 can be embedded in the video camera for connecting to mini plug 110 and RCA connector 130, and RCA connector 140, and adapter 160 coupled with S-video connector 150 can be connected to the television when a composite signal format is employed or S-video connector 150 can be connected to the television when an S-video signal format is used.

Figure 7:
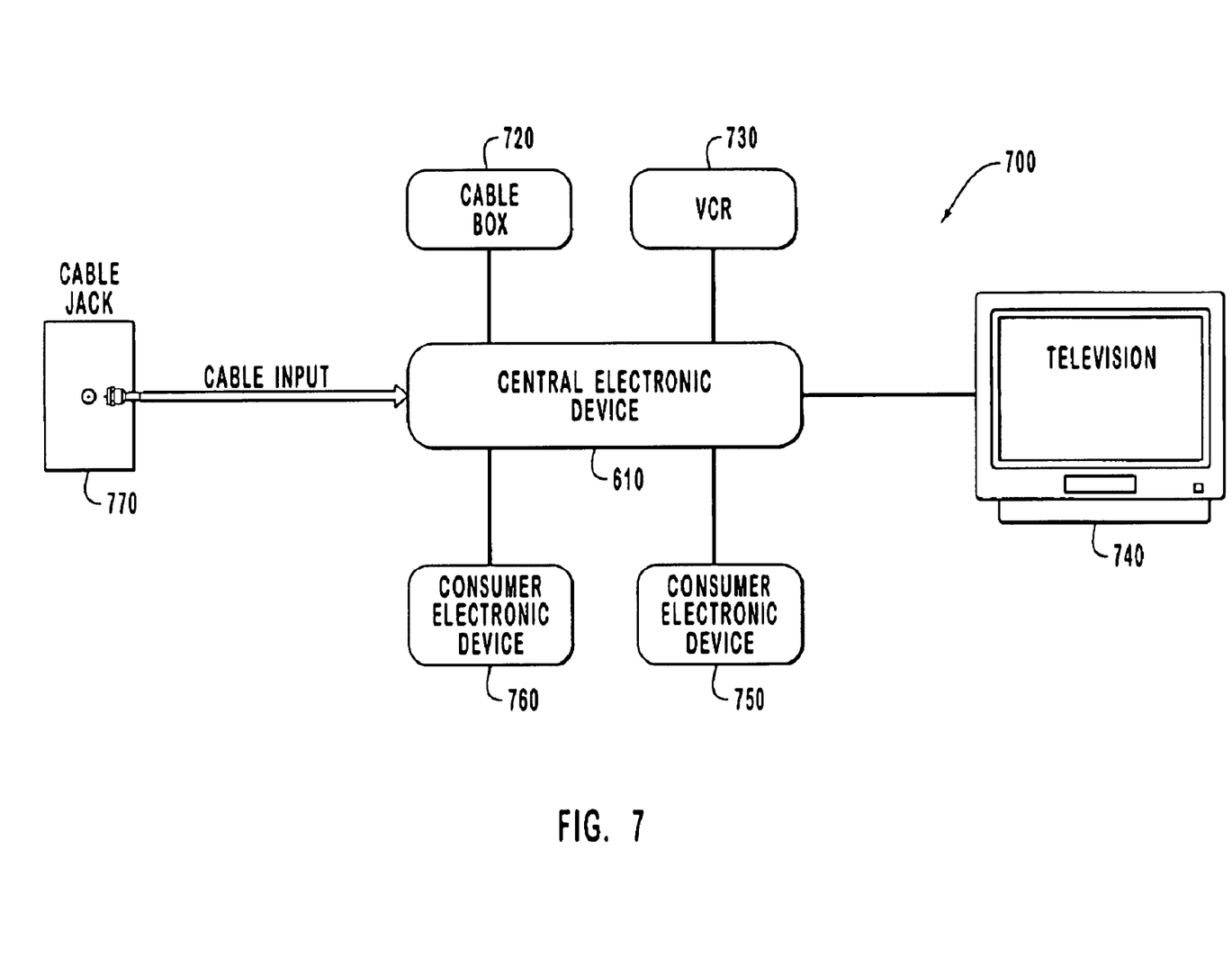
FIG. 7 is a schematic diagram that illustrates an example of an environment wherein an embodiment of the present invention can be implemented, namely a home entertainment system in a hub and spoke configuration.
Figure 8:
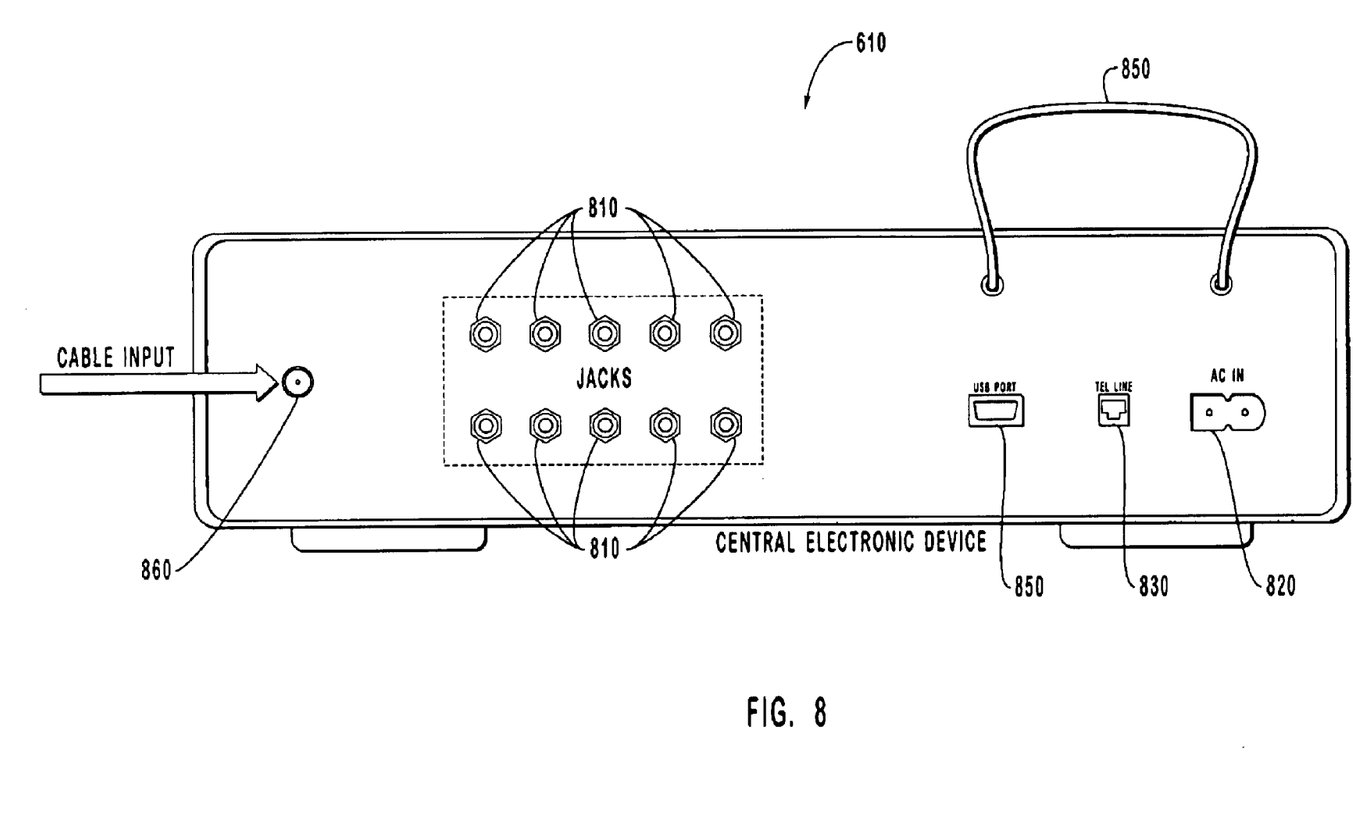
FIG. 8 illustrates a back panel of a central electronic device according to one embodiment of the invention, illustrating a plurality of identical, interchangeable jacks.
Figure 9:
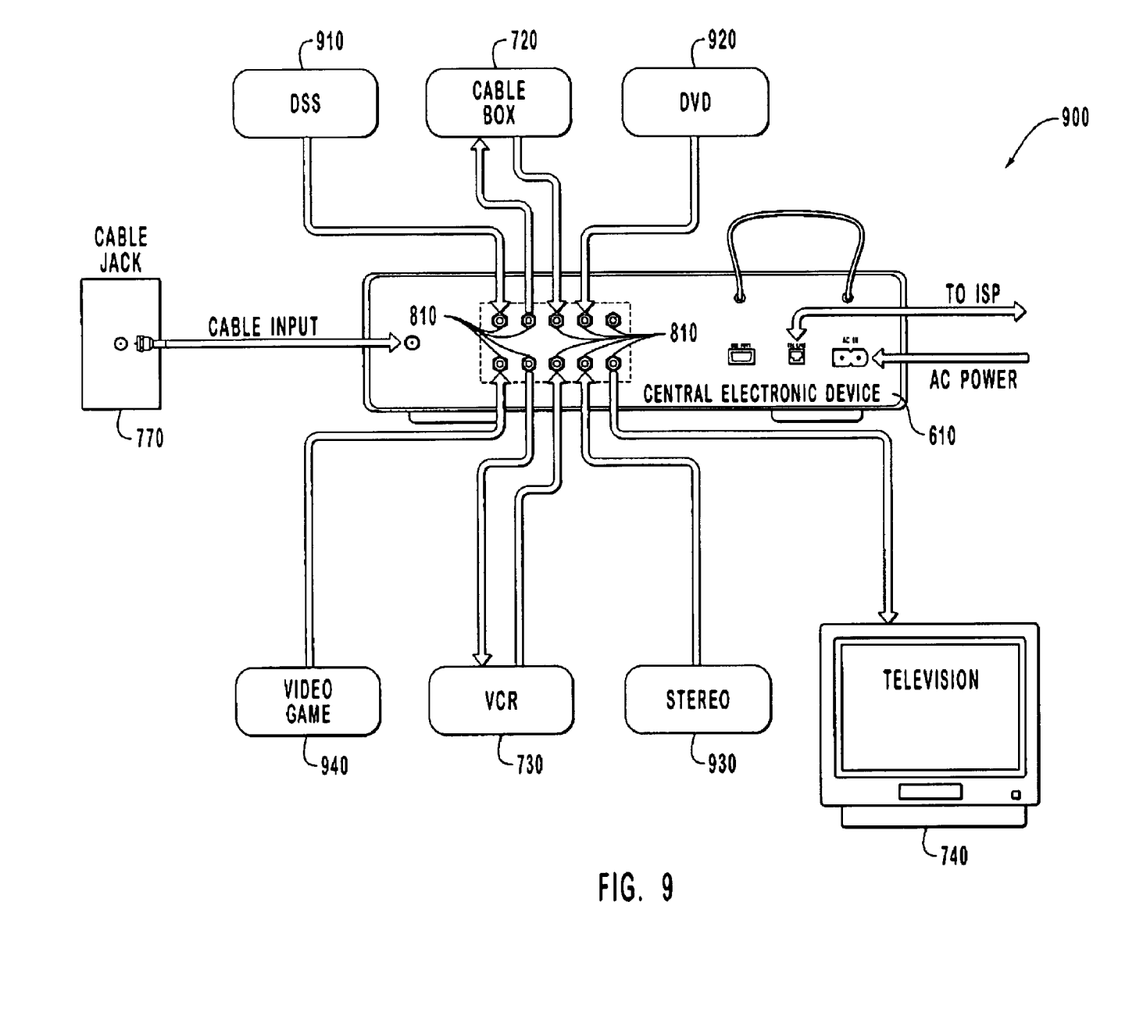
FIG. 9 is a schematic diagram depicting a home entertainment system in a hub and spoke configuration, illustrating the use of jacks for sending signals into and out of a central electronic device.

FIGS. 7–9 will be used to illustrate an environment in which an embodiment of the present invention is used to conveniently interconnect electronic devices of home entertainment systems that are arranged in a hub and spoke configuration. The environment is further detailed in U.S. patent application Ser. No. 09/244,222, entitled "System and Method for Interconnecting and Using Components of Home Entertainment System," incorporated herein by reference.

Referring first to FIG. 7, a home entertainment system, illustrated generally as entertainment system 700, has a variety of electronic devices connected to a central electronic device in a hub and spoke configuration. More specifically, home entertainment system 700 includes central electronic device 610 connected to cable box 720, VCR 730, television 740, consumer electronic device 750, consumer electronic device 760, and cable jack 770. In the hub and spoke configuration, all signals pass through, are received by, or are transmitted by central electronic device 610. Accordingly, central electronic device 610 can control, manage, process, reformat, route, or otherwise respond to any signal transmitted, generated, or received by any of the electronic devices connected to central electronic device 610. In one example, central electronic device is a WebTV box that has been modified to function as a central device in a hub and spoke configuration.

The hub and spoke configuration of the invention greatly simplifies the process of connecting components of a home entertainment system, maintaining the connections, and adding new electronic devices. A home entertainment system configured according to the hub and spoke configuration of FIG. 7 can have as few as two components (e.g., central electronic device 610 and television 740) or as many components as can be attached to central electronic device 610.

FIG. 8 illustrates one example of the many types of consumer electronic devices that can receive the mini plug of the connector systems of the invention. The back panel of central electronic device 610 includes means for connecting each of a plurality of electronic devices to the central electronic device in a hub and spoke configuration. Jacks 810 represent one example of such means. Each of jacks 810 is an identical connector that can be used to connect any of the plurality of consumer electronic devices to central electronic device 610 using the connector systems of the invention as explained above. Moreover, jacks 810 are interchangeable, and the user generally does not need to know any special connection techniques for the various consumer electronic devices other than connecting them to any desired jack 810.

Unlike the separate RCA-type, S-video, and other connectors typically found in conventional electronic devices, jacks 810 can be used to transmit or receive any of a variety of video, audio, or data signals from the consumer electronic devices. For instance, any particular jack 810 can function with stereo or mono audio signals, S-video signals, or RCA signals. This capability enables central electronic device 610 to conveniently interconnect cable boxes, satellite receivers, video tape recorders, video game consoles, video disk players, home theater equipment, home stereo equipment, television sets, and other consumer electronic devices without the user having to understand the different cables and connection techniques that have been conventionally used in home entertainment systems.

The number of jacks 810 can be enough to provide input to or output from each of the other consumer electronic devices included in the home entertainment system. While ten to twelve jacks are often enough to support a reasonably complex home entertainment system, the number may be greater or smaller depending on the number of consumer electronic devices desired as components of a home entertainment system.

The connection of a new electronic device to central electronic device 610 merely requires the user to connect the new device to one of the identical jacks 810 of FIG. 8. The task of connecting a new consumer electronic device to central electronic device 610 is basically the same, regardless of whether the new consumer electronic device is a video game console, stereo equipment, digital versatile disk players (DVDs) or the like. Thus, the user generally does not need to know any special requirements for connecting the new consumer electronic device. Furthermore, the existing devices, previously connected in the home entertainment system, do not need to be repositioned, reconfigured, or removed.

Central electronic device 610 further includes AC power input 820, phone jack 830 (to support the optional Internet access or other information services), and optionally universal serial bus (USB) port 840 and digital terrestrial antenna 850. Coaxial cable input 860 receives cable television signals from a cable provider.

Referring now to FIG. 9, a home entertainment system, illustrated generally as home entertainment system 900, includes central electronic device 610 connected to cable box 720, VCR 730, television 740, cable jack 770 and also connected to DSS 910, DVD 920, stereo 930, and video game 940. The electronic devices are connected to central electronic device 610 through jacks 810. As illustrated in FIG. 9, some of jacks 810 are used to send signals into central electronic device 610 while other jacks 810 are used to send signals out of central electronic device 610. In one embodiment, jacks 810 are labeled as "in" or "out" in order to facilitate the connection of the consumer devices. In another embodiment, intelligent switching in the software of central electronic device 610 takes place to identify whether a signal is sent in or out of a particular jack, as was explained above in correlation with FIG. 6.

As explained above, the present invention relates to systems and methods for use in inter-device connectivity and allow for switching between composite video and S-video formats. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. An interconnection cable system for interconnecting a first electronic device to a second electronic device, both electronic devices utilizing audio and video signals, the interconnection system comprising:

a plurality of electrical conductors for interconnecting the first electronic device and the second electronic device, each of the plurality of electrical conductors having a first end and a second end;

one or more male audio connectors, each being attached to the first end of one of the electrical conductors of the plurality of electrical conductors;

a mini plug is attached to the second end of the plurality of electrical conductors; and a male video connector attached to the first end of each of a subset of the plurality of electrical conductors, the male video connector being selectively adaptable for use with either a composite signal format or an S-video signal format such that the interconnection system is selectively usable with either the composite signal format or the S-video signal format, wherein the male video connector comprises a male S-video connector and an adapter having a female S-video end that can be selectively coupled with the male S-video connector and a male RCA end opposite the female S-video end for supporting the composite signal format, wherein the video connector supports the composite video signal format when the adapter is coupled with the male S-video connector.

2. An interconnection cable system as recited in claim 1, wherein the video connector comprises a male S-video connector for use with the S-video signal format.

3. An interconnection cable system as recited in claim 1, wherein the one or more male audio connectors comprises a left audio connector and a right audio connector that are capable of transmitting audio signals between the first electronic device and the second electronic device when the interconnection system is used with the composite video format.

4. An interconnection cable system as recited in claim 3, wherein the male video connector comprises an S-video connector including an S-video audio connector, the S-video audio connector, rather than the left audio connector and the right audio connector, being used to transmit audio signals when the interconnection system is used with the S-video format.

5. An interconnection cable system as recited in claim 1, wherein the mini plug includes a plurality of contact points.

6. An interconnection cable system as recited in claim 5, wherein the plurality of contact points include a first contact point for transmitting left audio signals, a second contact point for transmitting right audio signals, a third contact point for transmitting video chroma signals and a fourth contact point for transmitting video luma signals.

7. An interconnection cable system as recited in claim 6, wherein the plurality of contact points further includes a fifth contact point for ground.

8. An interconnection cable system as recited in claim 5, wherein the video connector comprises a male S-video connector for use with the S-video signal format.

9. An interconnection system for interconnecting a first electronic device to a second electronic device, both electronic devices utilizing audio and video signals, the interconnection system comprising:

a mini plug at a first end of the interconnection system and having a plurality of contact points, wherein the mini plug can be connected to the first electronic device; and a plurality of electrical conductors for interconnecting the first electronic device and the second electronic device, each of the plurality of electrical conductors having a first end and a second end, wherein the first end of each of the plurality of electrical conductors is connected to one of the contact points of the mini plug; and means for selectively adapting the interconnection system for use with either a composite video signal format or an S-video signal format, the means for selectively adapting the interconnection system being connected to the second end of at least some of the plurality of electrical conductors.

10. An interconnection system as recited in claim 9, wherein the plurality of contact points include a first contact point for transmitting left audio signals, a second contact point for transmitting right audio signals, a third contact point for transmitting video chroma signals and a fourth contact point for transmitting video luma signals.

11. An interconnection system as recited in claim 10, wherein the plurality of contact points further includes a fifth contact point for ground.

12. An interconnection system as recited in claim 9, wherein the means for selectively adapting the interconnection system comprises:

one or more audio connectors, each being attached to the second end of one of the electrical conductors of the plurality of electrical conductors; and a video connector attached to the second end of each of a subset of the plurality of electrical conductors, the video connector being selectively adaptable for use with either a composite signal format or an S-video signal format such that the interconnection system is selectively usable with either the composite signal format or the S-video signal format.

13. An interconnection system as recited in claim 9, further comprising a mini plug receptacle included in the first electronic device, the mini plug receptacle enabling the mini plug end to be connected to the first electronic device.

14. In a system that includes at least a first electronic device and a second electronic device, a method for communicating signals between the first electronic device and the second electronic device using either a composite signal format or an S-video signal format, the method comprising the steps of:

connecting the first electronic device with the second electronic device with an interconnection system that is selectively adaptable to transmit signals using either a composite video signal or an S-video signals, the interconnection system, when connecting the first electronic device with the second electronic device, being adapted to transmit the signal using a particular signal format selected from the composite video signal format and the S-video signal format;

at the first electronic device, determining whether the particular signal format is the composite signal format or the S-video signal format; and based on the determination made in the determining step, communicating between the first electronic device and the second electronic device using the particular signal format.

15. A method as recited in claim 14, wherein the interconnection system comprises:

a plurality of electrical conductors;

a mini plug for connecting the plurality of electrical conductors to the first electronic device; and at least one an audio connector and at least one video connector for connecting the plurality of electrical conductors to the second electronic device, wherein the second electronic device utilizes one of a composite signal format and an S-video signal format.

16. A method as recited in claim 15, wherein at least one video connector comprises a male S-video connector having a plurality of pins, and wherein the interconnection system further includes an adapter for use when the particular signal format is the composite signal format, the adapter having a female S-video end for mating with the male S-video connector and a male RCA end opposite the female S-video end for connecting the plurality of electrical conductors to the second electronic device.

17. A method as recited in claim 16, wherein two of the plurality of pins of the male S-video connector are shorted when the male S-video connector is mated with the female S-video end.

18. A method as recited in claim 16, wherein the step of determining comprises the step of measuring the impedance of associated with selected electrical connectors of the plurality of electrical connectors.

19. A method as recited in claim 18, wherein the step of measuring the impedance is conducted using a differential amplifier.

20. A method as recited in claim 18, wherein the step of measuring the impedance is conducted using an impedance sensor.

21. A method as recited in claim 15, further comprising the step of recognizing, by the first electronic device, that the mini plug has been inserted into a receptacle at the first electronic device, the step of recognizing further comprising the step of sensing a physical displacement of a component of the receptacle as the mini plug is inserted into the receptacle.

22. A method as recited in claim 15, further comprising the step of determining, at the first electronic device, whether the signal is transmitted into or out of the second electronic device.

23. A system for connecting a first electronic device to a second electronic device and for transmitting signals between the first electronic device and the second electronic device, the system comprising:

an interconnection system including:
  a mini plug at a first end of the interconnection system and having a plurality of contact points, wherein the mini plug can be connected to the first electronic device; and
  a plurality of electrical conductors for interconnecting the first electronic device and the second electronic device, each of the plurality of electrical conductors having a first end and a second end, wherein the first end of each of the plurality of electrical conductors is connected to one of the contact points of the mini plug; and
  means for selectively adapting the interconnection system for use with either a composite video signal format or an S-video signal format, the means for selectively adapting the interconnection system being connected to the second end of at least some of the plurality of electrical conductors; and
a receptacle that is included in the first electronic device and can couple with the mini plug.

24. A system as recited in claim 23, wherein when the receptacle is coupled with the mini plug, each of the plurality of contact points of the mini plug being in electrical contact with one of a plurality of contact points of the socket.

25. A system as recited in claim 24, wherein the receptacle includes another contact point, in addition to the plurality of contact points of the receptacle, the additional contact point being capable of ground sensing.

26. A system as recited in claim 23, wherein one of the plurality of contact points of the mini plug is for video chroma and another of the plurality of contact points of the mini plug is for video luma.

27. In a home entertainment system that includes a plurality of electronic devices and utilizes audio and video signals, a method for transmitting either composite or S-video signals through an interconnection system, the method comprising the steps of:

coupling a mini plug positioned at a first end of the interconnection system to a first electronic device so as to enable the transmission of audio and video signals between the interconnection system and the first electronic device; and coupling a connector positioned at a second, opposite end of the interconnection system to a second consumer electronic device so as to enable the transmission of the audio and video signals between the interconnection system and the second electronic device, wherein the connector is selectively adaptable to be used to transmit the audio and video signals in either a composite signal format or an S-video signal format.

28. A method as recited in claim 27, wherein the connector includes an S-video connector when the audio and video signals are to be transmitted between the interconnection system and the second electronic device in the S-video signal format.

29. A method as recited in claim 27, wherein the connector includes an S-video connector having a plurality of pins coupled with an adapter when the audio and video signals are to be transmitted in the composite signal format, the adapter comprising:

an RCA end that mates with the second consumer electronic device; and an S-video end that mates with the S-video connector, wherein two of the plurality of pins of the S-video connector are shorted when the S-video end is mated with the S-video connector.

* * * * *

UNITED STATES PATENT AND TRADEMARK OFFICE
CERTIFICATE OF CORRECTION

PATENT NO. : 6,907,615 B1  
APPLICATION NO. : 09/490882  
DATED : June 14, 2005  
INVENTOR(S) : Alexander et al.

Page 1 of 1

It is certified that error appears in the above-identified patent and that said Letters Patent is hereby corrected as shown below:

In column 1, line 14 delete "System" and insert -- Configuration --, therefor.

In column 1, line 32, after "fairly" delete "simply" and insert -- simple --, therefor.

In column 6, line 20, after "view of" delete "he" and insert -- the --, therefor.

In column 8, line 16, delete "desired" and insert -- desires --, therefor.

In column 11, line 17, in Claim 6, delete "claim 5" and insert -- claim 1 --, therefor.

Signed and Sealed this

Twenty-first Day of July, 2009

JOHN DOLL  
*Acting Director of the United States Patent and Trademark Office*